June 17, 1952    L. F. ZERNICKE    2,601,079
MILK STRAINER
Filed Feb. 8, 1949
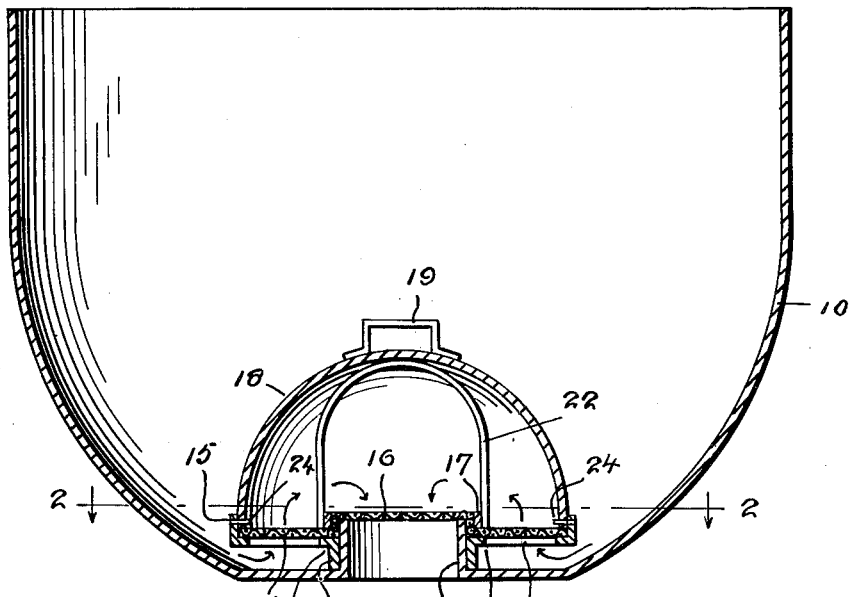
Fig. 1.
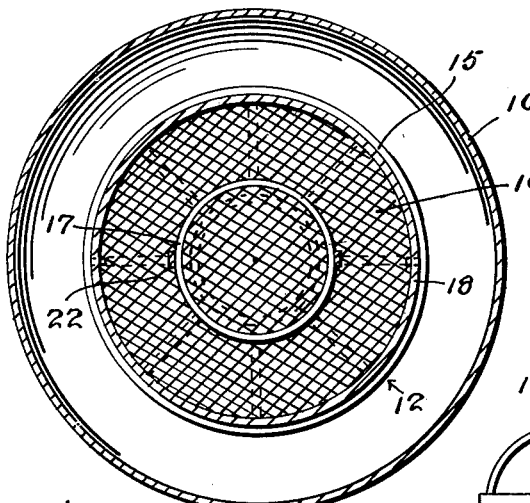
Fig. 2.
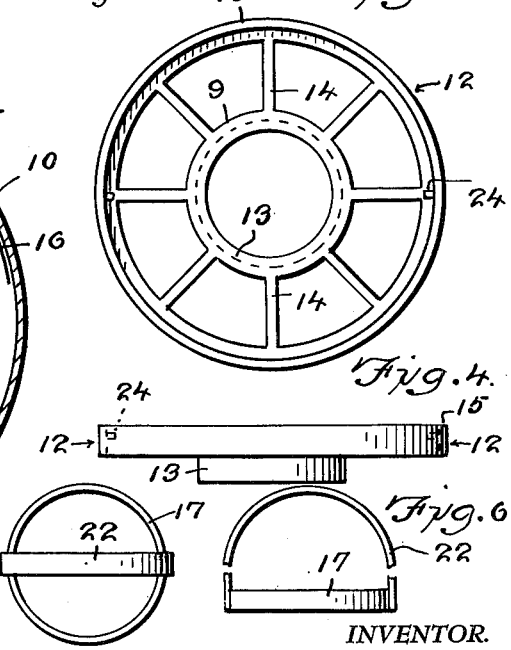
Fig. 3.
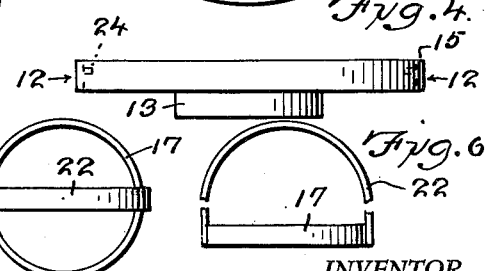
Fig. 4.
Fig. 5.
Fig. 6.
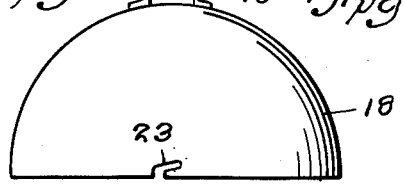
Fig. 7.
INVENTOR.
Leonard F. Zernicke
BY Victor J. Evans & Co.
ATTORNEYS Patented June 17, 1952

2,601,079

UNITED STATES PATENT OFFICE 2,601,079

MILK STRAINER

Leonard F. Zernicke, Oshkosh, Wis.

Application February 8, 1949, Serial No. 75,175

2 Claims. (Cl. 210—157)

This invention relates to a strainer, and more particularly to a strainer for milk.

The object of the invention is to provide a milk strainer which will remove all solid matter from the milk.

Another object of the invention is to provide a milk strainer wherein the parts may be readily disassembled for replacing the filtering element.

A further object of the invention is to provide a milk strainer which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a side elevational sectional view of the milk strainer, according to the present invention;

Figure 2 is a sectional view taken on the line 2—2 of Figure 1;

Figure 3 is a top plan view of the member for supporting the filtering pad;

Figure 4 is a side elevational view of the member for supporting the filtering pad;

Figure 5 is a top plan view of the ring for maintaining the filtering pad in place;

Figure 6 is a side elevational view of the ring of Figure 5;

Figure 7 is a side elevational view of the cap.

Referring in detail to the drawings, the numeral 10 designates an open-topped hopper which is provided with an open-ended neck 11 in its bottom for the egress therethrough of strained milk.

Positioned in the hopper 10 and arranged in surrounding relation with respect to the neck 11 is a support member 12, Figures 1, 3 and 4. The support member 12 comprises an annular rim 13 which surrounds the neck 11 and abuts the bottom of the hopper 10 when the strainer is assembled. A transverse lip 9 projects from the rim 13 and a plurality of radially-disposed, spaced arms 14 projects from the lip 9 and are secured to the latter. An annular flange 15 projects upwardly from the outer ends of the arms 14 and is secured thereto.

A circular filtering pad 16 fabricated of flexible wire screen, or straining cloth, or other suitable material, is supported on the top of the support member 12. A ring 17 provided with a handle 22, Figures 1, 5 and 6, engages the intermediate portion of the pad 16 and embraces the neck 11 for maintaining the pad extended across the neck 11.

A cap 18 is received by the annular flange 15 of the support member 12 and coacts with the latter to maintain the filtering pad 16 extended across the support member 12. The cap 18 is provided with a handle 19 adapted to be gripped by the user when the cap 18 is to be removed or replaced, as for disassembling or assembling the milk strainer. The handle 22 of the ring 17 abuts the interior portion of the cap 18, Figure 1. The cap 18 is provided with opposed recesses 23 for receiving tongues 24 that project from the flange 15 whereby the cap 18 is releasably fastened to the support member 12.

From the foregoing, it will be apparent that when the ring 17, filtering pad 16, support member 12, and cap 18 are assembled in the hopper 10, a simple and effective device for filtering milk is provided. The milk to be strained is poured into the open top of the hopper 10 and flows in the direction of the arrows, Figure 1, between the arms 14 and up through the filtering pad 16 for the first filtering step. The milk then flows down through the center of the pad 16, thus a second filtering step is performed on the milk, and the doubly-strained milk flows out through the neck 11. It will be seen that the milk is strained twice, once upwardly, and then downwardly through the filtering pad or cloth 16. Further, the various parts of the strainer can easily be separated and cleaned.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a milk strainer, an open topped hopper, an upstanding neck in the bottom of the hopper for the egress therethrough of strained milk, a support member, comprising an annular upstanding rim positioned within said hopper and arranged in surrounding relation with respect to said neck, said rim abutting the bottom of said hopper and extending to a point short of the top of said neck, a transverse lip projecting from the top of said rim, a plurality of radially disposed spaced arms projecting from said lip and secured to the latter, an annular flange projecting upwardly from the outer ends of said arms and secured thereto, a filtering pad extending across said neck and supported on the arms of said support member, a cap arranged within said hopper and coacting with the flange on said support member for releasably maintaining said filtering pad on said support member, a handle on said cap for manually moving the latter into and out of coacting relation with said support member, a ring arranged above said support member and embracing the top portion of said neck for maintaining said filtering pad in extended position across said neck, a handle secured to said ring, and interengaging means on said cap and flange for releasably connecting said cap to said support member.

2. The apparatus as described in claim 1, wherein said interengaging means comprises tongues projecting from said flange, there being opposed recesses in said cap for receiving therein said tongues.

LEONARD F. ZERNICKE.

REFERENCES CITED

The following references are of record in the file of this patent:

UNITED STATES PATENTS

| Number | Name | Date |
| --- | --- | --- |
| 1,427,565 | Walker | Aug. 29, 1922 |
| 1,910,774 | Saunders | May 23, 1933 |
| 2,256,717 | Kors | Sept. 23, 1941 |
| 2,273,927 | Brant | Feb. 24, 1942 |